United States Patent [19]

Uecker et al.

[11] Patent Number: 5,127,621
[45] Date of Patent: Jul. 7, 1992

[54] PIVOTABLE SEAT ASSEMBLY WITH LATCH MECHANISM

[75] Inventors: Ronald T. Uecker, Slinger; Bruce B. Dahlbacka, Port Washington, both of Wis.

[73] Assignee: Milsco Manufacturing Company, Milwaukee, Wis.

[21] Appl. No.: 811,286

[22] Filed: Dec. 16, 1991

[51] Int. Cl.⁵ .............................................. F16M 13/00
[52] U.S. Cl. .................................. 248/425; 248/416; 297/349
[58] Field of Search ............... 248/416, 425, 418, 419, 248/429, 430, 188.5, 423, 424, 407; 297/345, 346, 349, 344; 296/65 R

[56] References Cited

U.S. PATENT DOCUMENTS

| | | | |
|---|---|---|---|
| 3,300,172 | 1/1967 | Noller | 248/425 |
| 3,412,968 | 11/1968 | Rose | 248/425 |
| 3,542,326 | 11/1970 | Reapsummer | 297/344 X |
| 4,014,507 | 3/1977 | Swenson . | |
| 4,227,670 | 10/1980 | Burgh | 297/346 X |
| 4,241,893 | 12/1980 | Koutsky | 248/425 |
| 4,417,715 | 11/1983 | Edwards | 297/349 X |
| 4,570,997 | 2/1986 | Tanizaki | 248/427 X |
| 4,822,099 | 4/1989 | Negi | 297/349 |
| 4,844,543 | 7/1989 | Ochiai | 297/349 |

FOREIGN PATENT DOCUMENTS

| | | | |
|---|---|---|---|
| 2446198 | 9/1980 | France | 248/425 |
| 61-16140 | 1/1986 | Japan | 248/425 |

Primary Examiner—J. Franklin Foss
Attorney, Agent, or Firm—Nilles & Nilles

[57] ABSTRACT

A pivotable seat assembly for a mobile vehicle that allows the seat to be adjusted in fore or aft directions, pivoted to a position facing either of the directions, and then releasably latched against pivoting. The seat assembly includes a vertical support shaft member securable to the vehicle with a freestanding end having a primary abutment thereon; a rotatable support frame member having a top portion with the support frame member being rotatably mounted on the support shaft member so that the primary abutment projects beyond the top portion; a carriage for supporting the seat on the rotatable support frame member for sliding movement to a limit position; a latch assembly for selectively preventing rotation of the rotatable support frame member operatively connected between the support shaft and the rotatable support frame including, a fixed latch secured to one of the members, a shiftable latch mounted on the other member for movement into and out of engagement with the fixed latch, and a biasing spring for normally biasing the shiftable latch into engagement; a primary stop mounted on the carriage for movement therewith in the fore and aft directions and contactable with the primary abutment to define the carriage limit position; and a latch actuator mounted on the carriage for movement therewith into contact with the shiftable latch to move it out of engagement with the fixed latch and permit pivoting of the seat when the primary stop is in contact with the primary abutment to limit the amount of stress applied to the shiftable latch and the slidable carriage.

8 Claims, 5 Drawing Sheets

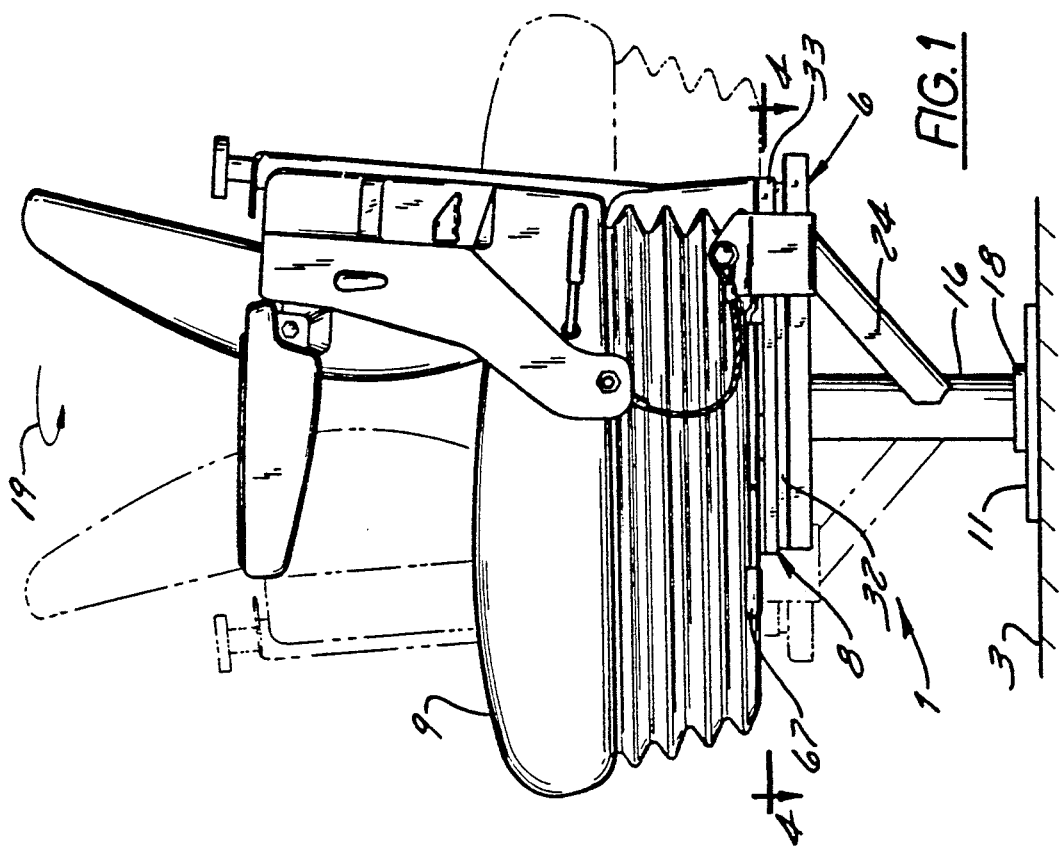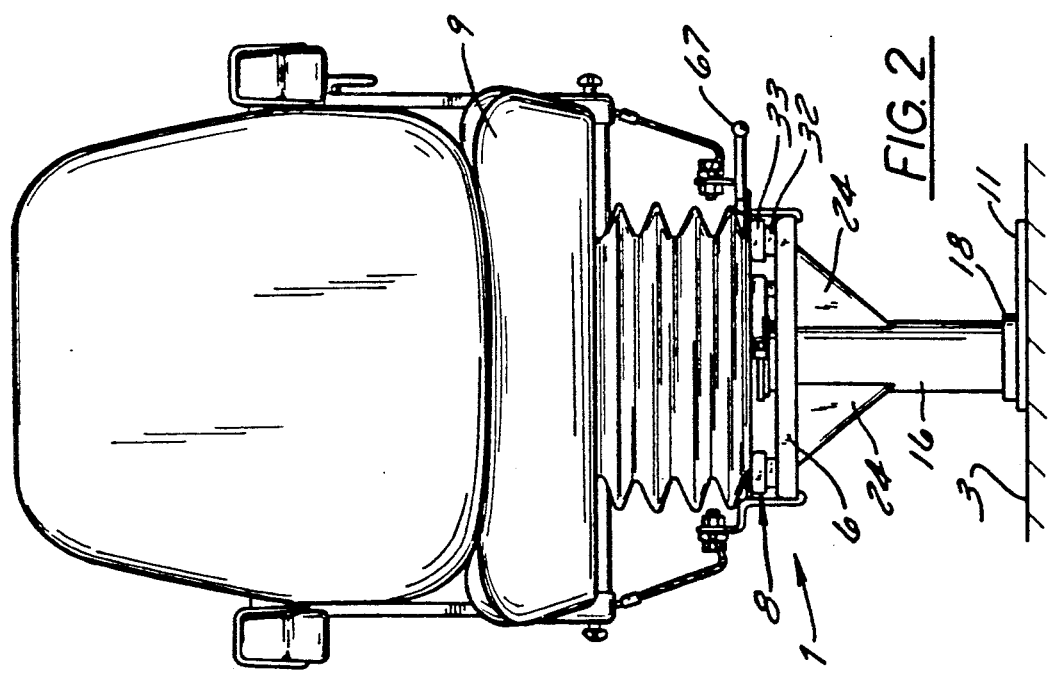

PIVOTABLE SEAT ASSEMBLY WITH LATCH MECHANISM

BACKGROUND OF THE INVENTION

1. Field of the Invention

This invention relates to a seat assembly that releasably mounts a seat for both fore and aft travel and pivotal movement on a mobile vehicle such as a tractor and more particularly to an arrangement for limiting stress on both the pivot latch mechanism and the fore-and-aft seat adjuster assembly.

2. Description of the Related Art

Seat supporting assemblies are known which permit the seat first to be slid in a rearward direction on tracks of the fore-and-aft seat adjuster assembly to move the operator away from the steering wheel, control levers and other obstructions, and then unlocked for rotation to a safe and convenient dismount position. This type of seat supporting assembly is disclosed in U.S. Pat. No. 4,014,507, R. Swenson, issued Mar. 29, 1977, and that seat assembly functions well in the use for which it was designed, that is, to assist the operator in safely and conveniently dismounting from a substantially level tractor.

Some purchasers mount attachments on the rear of the tractor, such as a back hoe that has independently operable controls, and the use of such controls requires the seat to be rotated 180° so that the operator will face the rear of the tractor in order to have access to the operating controls for the attachment. The known slidable and pivotable seat arrangements as disclosed in U.S. Pat. No. 4,014,507 have had their intended use expanded by the purchasers to include operation of controls located both at the front and rear of the tractor seat, and this includes fore-and-aft seat movement when the tractor cannot be maintained in a horizontal position.

With rear mounted attachments, the tractor is required to be operated on uneven rough terrain and frequently must be parked with its longitudinal axis at a substantial angle to horizontal. In order to pivot the seat, the operator must first move the seat to its rearmost limit position away from the controls to release the pivot latch mechanism. With the tractor at a substantial angle, one longitudinal direction of seat travel will always be downhill. The fore-and-aft seat adjuster assemblies include internal stops to limit the extent of seat travel in the fore and aft directions. It has been found that heavyweight tractor operators, some weighing 250 pounds or more, plant their feet and push strongly rearward with their legs to cause the seat to travel downhill to a rearmost limit stop position away from whatever controls it faces with such force that prior art pivot latch mechanisms and standard-duty fore-and-aft seat adjuster assemblies do not withstand the stress loading applied by repeated punishing impacts they are subjected to when the seat comes into contact therewith for the purpose of shifting it to an unlatched position. In an attempt to solve the stress failure problem, the tracks and stops of the fore-and-aft seat adjuster assemblies have been made larger and stronger for heavy-duty service. Such heavy-duty seat adjuster assemblies have not solved the problems and significantly increase costs. Further, such expensive, heavy-duty seat adjuster assemblies tend to offer an increase in resistance to fore-and-aft sliding when the tractor is on level terrain which some operators find undesirable. Stress induced failure does not normally develop when the seat is moved to its frontmost limit position toward the controls because the operator is literally pulling the seat toward the frontmost position with his feet and legs and is only able to generate a small fraction of the force that he can generate when pushing rearward.

Making the latch and fore-and-aft seat adjuster assemblies even larger, heavier and stronger would seem to be available as an obvious solution. Unfortunately, the space under the seat wherein the pivot release latch and fore-and-aft seat adjuster assemblies are mounted is severely limited and does not conveniently permit the latch and fore-and-aft seat adjuster assemblies to be made large and heavy enough to withstand the excessive forces that are imposed on them during normal operation. Further, increasing size or reenforcing the latch and the fore-and-aft seat adjuster assemblies results in excessive costs and still does not solve the problem. Therefore, a need exists for a pivotable seat assembly that can use a latch mechanism along with low cost, standard-duty seat adjusters without such components being subject to undue stress and failure.

Another requirement that exists is the need for control switches on the seat assembly which may be used for many purposes such as causing an audible alarm to sound when the seat is rotated to a specific predetermined position. The requirement for switches gives rise to a need for a way to thread conductors up to the seat in a manner that will minimize risk of damage to the conductors during operation of the seat. In the prior art designs, the latch design does not afford a convenient passage through which a conductor can be safely threaded.

SUMMARY OF THE INVENTION

The present invention provides an improved pivotable seat assembly which increases the reliability of the latch and minimizes the risk that the latch and the fore-and-aft seat adjuster assemblies will be damaged or prematurely worn out due to excessive stress loading. The seat assembly comprises a rigid, stationary, substantially vertical support shaft member securable to the tractor that has a freestanding end presenting a primary abutment means thereon. A rotatable support frame member is provided that has a top portion, and this support frame member is rotatably mounted on the support shaft member so that the primary abutment means on the support shaft projects beyond the top portion of the frame member. A carriage on which the seat is mounted is secured on the rotatable support frame member for movement to fore-and-aft limit positions. A latch assembly for selectively preventing rotation of said rotatable support frame member is operatively connected between the support shaft and the rotatable support frame member. The latch assembly includes a fixed latch secured to one of the members and a shiftable latch mounted on the other of said members for movement into and out of engagement with said fixed latch. The shiftable latch has a biasing spring for normally biasing the shiftable latch into the engagement position. A primary stop is mounted on the carriage for movement therewith as the carriage travels in the fore and aft directions. The primary stop is contactable with the primary abutment on the support shaft to define said fore-and-aft limit positions. A latch actuator is also mounted on the carriage for movement therewith into contact with the shiftable latch to move it out of engagement with the fixed latch and to permit pivoting of said seat when the primary stop is in contact with the primary abutment means to substantially reduce the amount of stress applied to the shiftable latch and the fore-and-aft adjuster assemblies during operation.

BRIEF DESCRIPTION OF THE DRAWINGS

Referring to the drawings:

FIG. 1 is a side elevation view of a vehicle seat assembly incorporating the invention;

FIG. 2 is a front elevational view of the seat assembly shown in FIG. 1;

DESCRIPTION OF THE PREFERRED EMBODIMENTS

Figure 3:
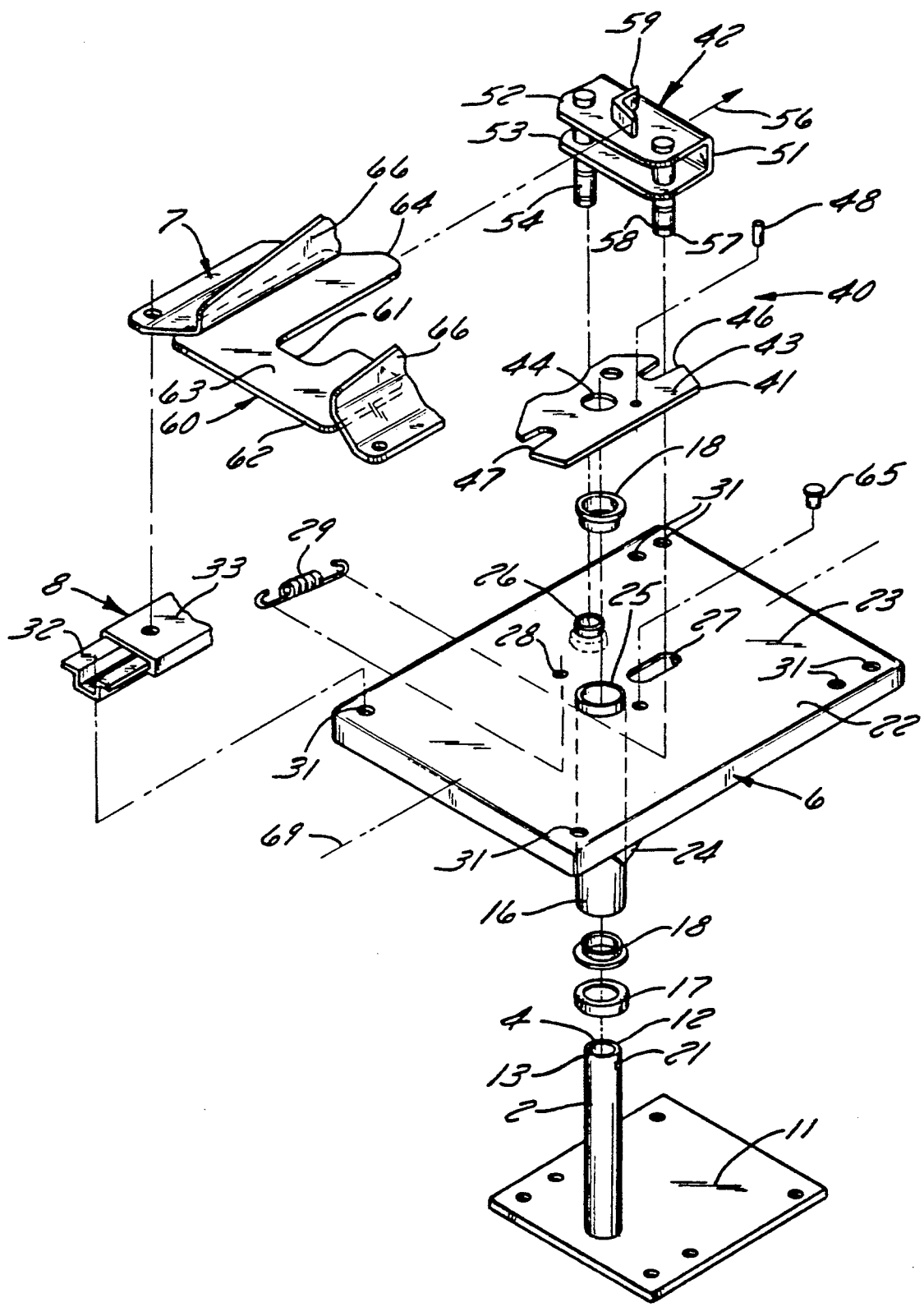
FIG. 3 is an exploded isometric projection view of a portion of the seat structure shown in FIG. 1 with the seat cushion and backrest removed.

With reference to FIGS. 1-3, the pivotable seat assembly 1 of the present invention generally comprises a rigid vertically extending support shaft 2 adapted to be fixed in a stationary manner on the vehicle such as a tractor 3; a rotatable support frame member 6 rotatably supported on the support shaft 2; a fore-and-aft seat adjuster assembly which includes a carriage 7 that supports a seat 9 reciprocally mounted by track assemblies 8 on the rotatable support frame member 6; a primary stop means 60; and a latch assembly 40.

Referring to FIGS. 1, 2 and 3, the rigid support shaft member 2 comprises a base plate 11 which can be secured to the vehicle 3 by any suitable fastening means such as bolts, not shown. The vertically extending support shaft 2 has a bore 4 therethrough and is secured to the base plate 11 by welding. Shaft 2 is thus rigidly supported to extend in a substantially vertical direction when mounted in an operative position on the tractor. The support shaft member 2 terminates in a freestanding end 12 which has a primary abutment means 13 thereon. The support shaft 2 is hollow to serve as a raceway for electrical conductors and includes a conductor egress opening 21 preferably in the form of a circumferential slot adjacent the freestanding end 12. The open top end of bore 4 could also serve as an egress opening.

The rotatable support frame member 6 includes a sleeve 16 adapted to be mounted around support shaft 2 for rotation relative thereto, as illustrated by arrow 19 (FIG. 1), by means of a cup washer 17 and flange bearings 18 located adjacent at its upper and lower ends. The rotatable support frame member 6 further includes a plate member 23 which is non-rotatably secured adjacent the upper end 25 of the rotatable sleeve 16 and is reenforced by braces 24. The egress opening 21 is located above the top portion 22 of the rotatable support frame member 6. The plate member 23 includes: a sleeve bearing 26 adapted to rotatably receive a latch assembly 40, which will be more fully described hereinafter; an elongated latch pin receiving slot 27; an aperture 28 for securing one end of a latch biasing means in the form of coil spring 29; and a plurality of apertures 31 for use in mounting the lower tracks 32 of the track assemblies 8 with only one of the assemblies 8 being shown in FIG. 3.

The latch assembly 40 for selectively preventing rotation of the rotatable support frame member 6 is operatively connected between the support shaft 2 and the rotatable support frame 6. The latch assembly 40 includes a fixed latch 41 non-rotatably secured to the freestanding end 12 of the support shaft 2 and a shiftable latch member 42 that is mounted on the rotatable support frame member 6 for pivotal movement into and out of engagement with the fixed latch 41.

Figure 4:
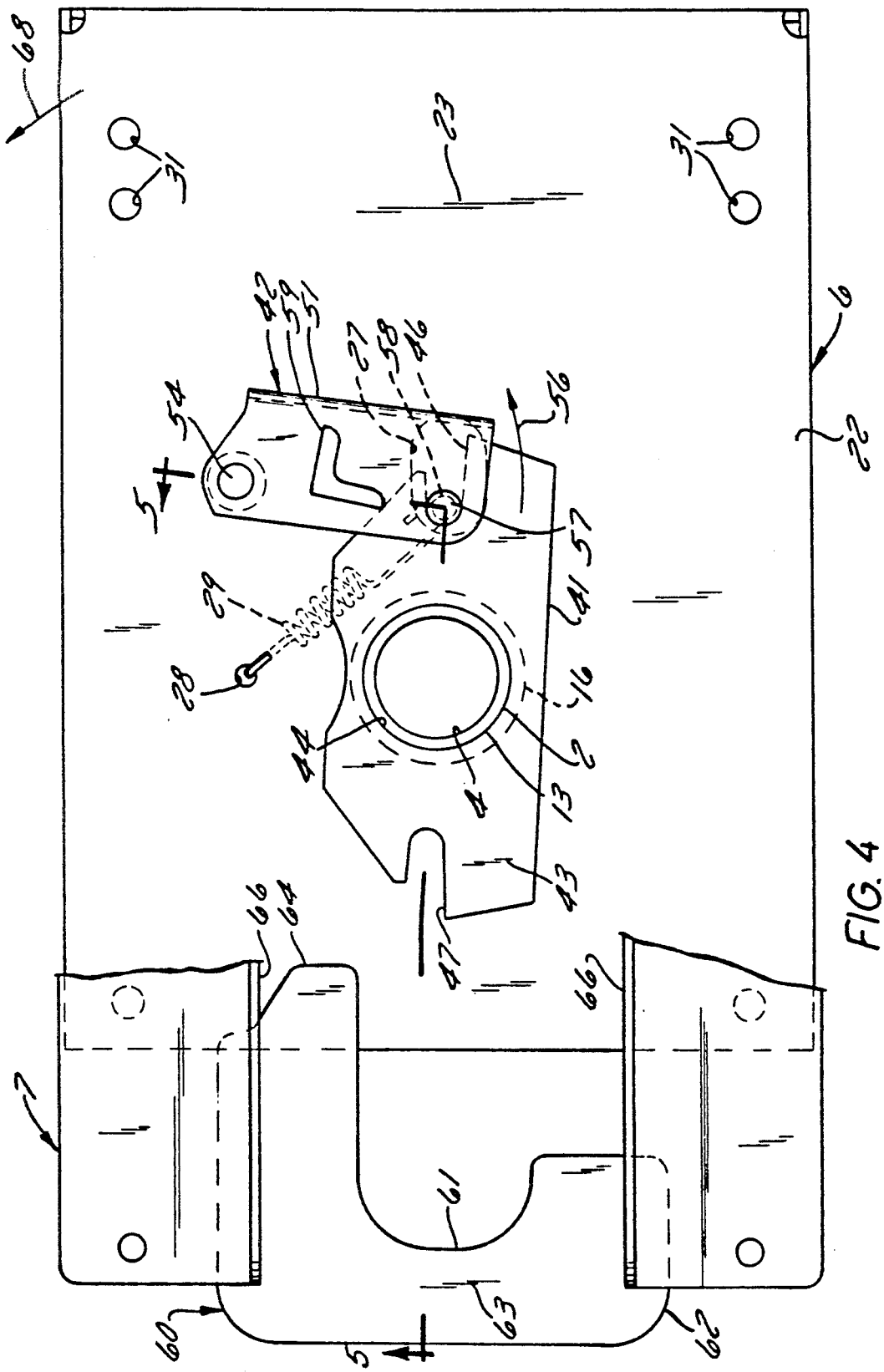
FIG. 4 is a top view taken along line 4—4 of FIG. 1.
Figure 5:
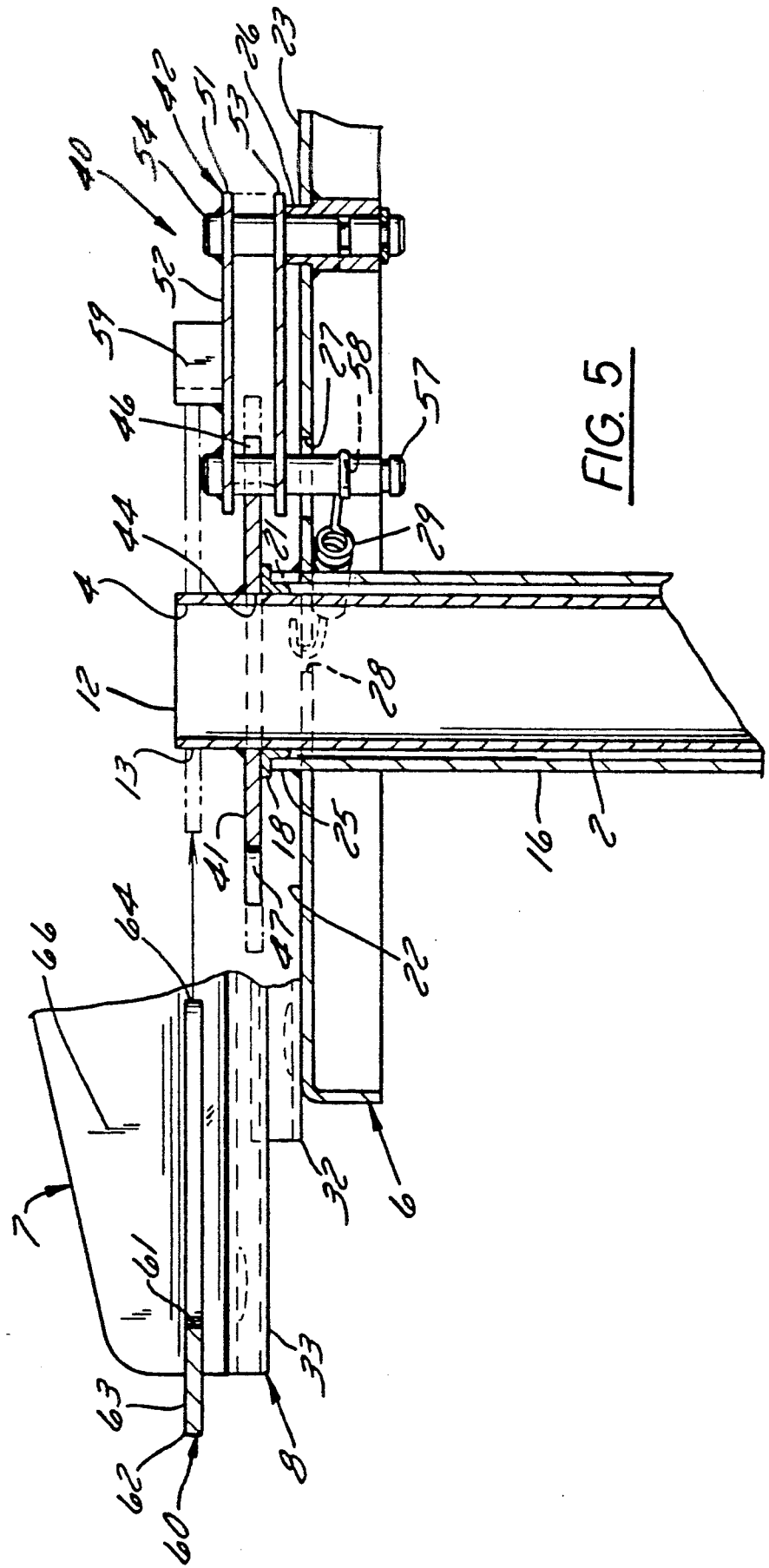
FIG. 5 is a sectional view taken along line 5—5 of FIG. 4.

Referring more particularly to FIGS. 3, 4 and 5, the fixed latch 41 includes a plate member 43 having an aperture 44 therethrough in alignment with the bore 4 that extends through support shaft 2. The fixed latch plate 43 includes generally U-shaped latch pin receiving notches 46, 47 at the fore and aft ends thereof. The fixed latch plate 43 also is apertured to receive a switch component such as a magnetic switch 48, the function of which will be more fully described hereinafter.

The shiftable latch assembly 40 includes a U-shaped channel member 51 having upper and lower spaced apart flange or plate means 52 and 53. A latch pivot pin 54 is mounted in the channel member 51 and preferably extends between the upper and lower plate means 52 and 53 and extends downward from the lower plate means 53 into sleeve bearing 26 carried by the rotatable support frame member 6. The pivot pin 54 permits the shiftable latch 40 to be moved angularly fore and aft in the direction of arrow 56 in FIG. 4. A latch pin 57 is also mounted in the channel member 51 and preferably passes between the upper and lower plate means 52, 53. The latch pin 57 is radially offset from pivot pin 54 and extends downward from the lower plate 53 through access slot 27 in the rotatable support frame member 6. The lower end of the latch pin 57 is provided with a annular slot 58 adapted to receive the latch biasing spring 29 which extends between latch pin 57 and the mounting aperture 28 in the rotatable support frame member 6. A latch contact portion 59 is secured to the upper plate 52, and the function of this contact portion will be described hereinafter.

The pivotable seat assembly 1 also includes a primary stop means 60, best shown in FIGS. 3 and 4, for movement with the carriage 7 as it travels in fore and aft directions. The primary stop means 60 has an abutment stop 61 which is contactable with the primary abutment means 13 on the freestanding end 12 of the support shaft 2 and this stop defines the aft limit position for the seat 9 along fore-and-aft axis 71. The primary stop means 60 includes a bifurcated U-shaped stop plate member 62 with the abutment stop 61 being located at the bight portion 63 of the U-shaped plate member. The primary stop means 60 also includes a latch actuator or push member 64 which is positioned to contact the latch contact portion 59 of the movable latch. The U-shaped primary stop is secured between left- and right-hand adjuster or track mounting brackets 66 which support the seat 9. The brackets 66 serve to mount the upper tracks 33 of the adjuster assemblies 8. The push member 64 constitutes one leg of the U-shaped plate and is offset laterally from the freestanding end 12 of the support shaft 2 so that as it reciprocates during operation it will bypass the top end and contact the latch contact portion 59 of the shiftable latch 42. Contact of the push member 64 with the latch contact portion 59 will move the shiftable latch pin 57 out of engagement with the notch 46 or 47 of the fixed latch 41 in order to permit pivoting the seat.

Figure 6:
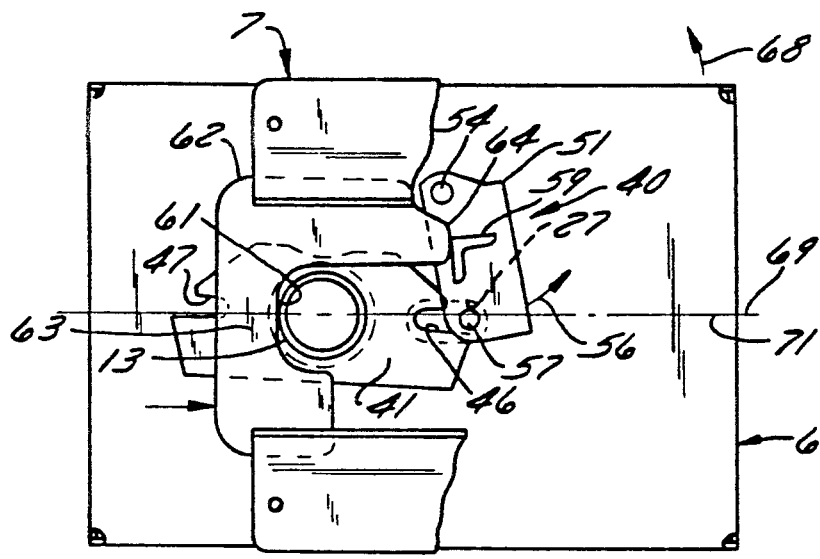
FIG. 6 is a top view similar to FIG. 4 showing the latch in a released position.

The operation of the seat assembly will now be described. When the seat 9 is facing in either the fore or aft direction, latch pin 57 of the shiftable latch 42 will be engaged with one or the other of the notches 46 or 47 in the fixed latch plate 41 and rotational movement of the seat is thereby prevented. The push member 64 is aligned to be laterally offset from shaft 2 to bypass the freestanding top end 12 of the shaft 2 and, therefore, the seat is free to be moved away from whatever controls it now faces on tracks 8 when the track latching lever 67, FIGS. 1 and 2, is released. Normal fore-and-aft adjustment movement of the seat 9 on tracks 8 relative to the rotatable support frame member 6 will not release the rotation preventing latch assembly 42 unless the seat is moved away from the controls it faces to the limit position wherein abutment stop 61 contacts the primary abutment means 13 at the freestanding end 12 of support shaft 2. When this has occurred, the push member 64 will contact the latch contact portion 59 of the shiftable latch 42 and move pin 57 in the direction of arrow 56 out of contact with slot 46, as shown in FIG. 6. Because abutment stop 61 contacts freestanding end 12 of support shaft 2, the latch assembly 40 and the internal stops (not shown) of the track assemblies 8 are subjected to minimal stress. If desired, the abutment stop 61 can be located so that the internal stops of the track assemblies are minimally used or not even used at all.

With pin 57 removed from slot 46, the entire rotatable support frame member 6 can be rotated 180° in the direction of arrow 68, as shown in FIG. 6. Preferably the magnetic switch 48 will include a fixed magnet component 65 mounted in plate 23. Pivotal movement of the rotatable support frame member 6 will move switch 48 out of proximity with magnet 65 to activate or inactivate switch 48 as may be required. The switch 48 can be connected to activate any desired component such as an audible alarm, or to inactivate any desired function such as to prevent operation of any controls while the seat is being rotated.

Figure 7:
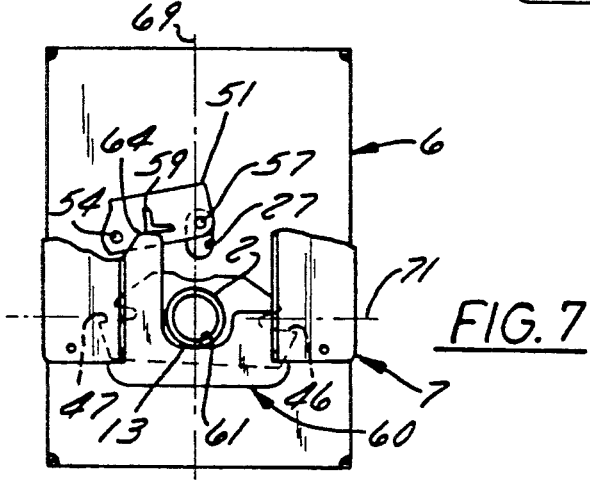
FIG. 7 is a top view similar to FIG. 6 showing the seat rotatable support frame in an intermediate position of rotation from fore to aft positions.
Figure 8:
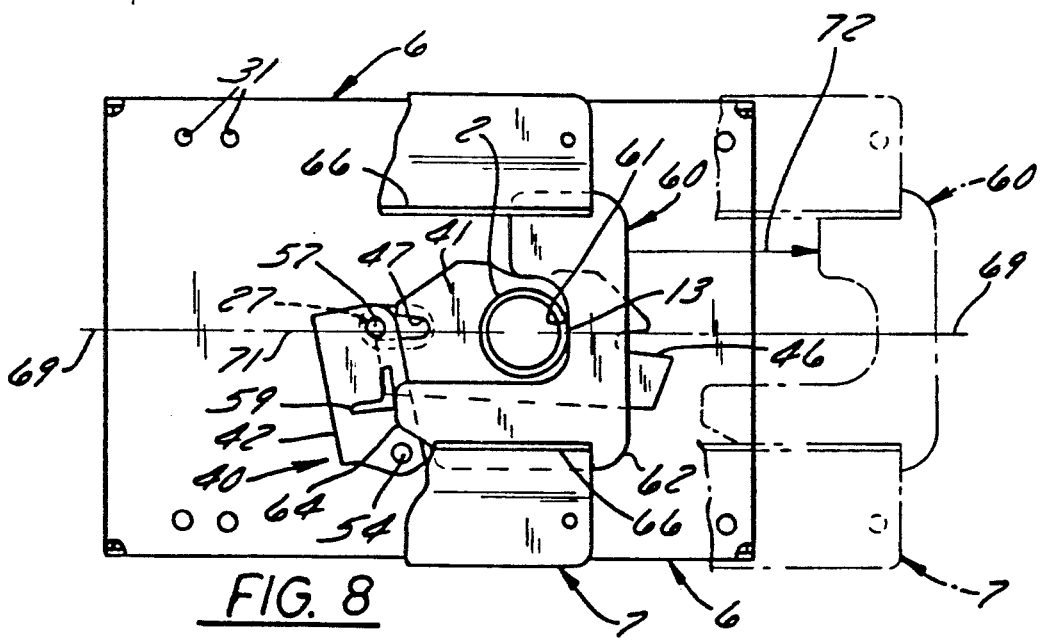
FIG. 8 is a top view of the seat rotatable support frame rotated to orientate the seat in the opposite direction to that shown in FIG. 6 with a portion of a primary stop means shown in dot-dash lines.

As the rotatable support frame member 6 rotates, it will assume an intermediate position with its major axis 69 transverse to the fore and aft axis 71, as shown in FIG. 7. Rotation of the rotatable support frame member 6 continues until it reaches the position shown in FIG. 8 wherein its major axis 69 is coincidental with fore and aft axis 71 and with the shiftable latch lock pin 57 now in alignment with slot 47 of fixed latch plate 41. During this rotation, the abutment stop 61 remains in constant contact with the primary abutment means 13 at the top freestanding end 12 of the support shaft 2, and thus the stress that is applied to shiftable latch 42 and the fore-and-aft seat adjuster track assemblies is limited to a very small amount. When the seat rotation is completed, the operator can release the track locking lever 67 and slide the carriage 7 with seat 9 into any desired working position from the controls it now faces. The primary stop plate 62 moves along with the seat 9 in the direction of the arrow 72, as indicated in FIG. 8, thus withdrawing the latch actuator push member 64 from contact with the latch contact portion 59. This permits spring 29 to cause the latch pivot lock pin 57 to seat itself in slot 47 and lock the rotatable support frame member 2 against rotation. As shown in FIG. 4, the sides of each of the fixed latch notches 46 47 are tapered and the latch lock pin 57 will seat against these tapered side portions in order to eliminate any play when the shiftable latch 42 is in its rotation locking position.

The fore-and-aft length of access slot 27 is long enough to provide the shiftable latch 42 with an overall total length of arcuate travel in the direction of arrow 56 that is greater than a first range of travel of the shiftable latch 42 required to move pin 57 out of either slot 46 or 47. Thus, it is to be understood that when push member 64 is in contact with latch contact portion 59 and primary stop 61 comes into contact with primary abutment 13 to terminate movement of the carriage 7, the shiftable latch 42 has only moved through its first range of travel and is still free to continue its movement in the direction of arrow 56. Therefore, substantially all impact loading is absorbed by the rigid support shaft 2 which substantially limits the amount of stress applied to shiftable latch 42 and the track assemblies 8. Even when wear of primary stop 61 and primary abutment 13 occurs, which permits the push member 64 to travel even closer to the shiftable latch 42, the latch 42 still remains free to rotate further in the direction of arrow 56. Therefore, movable latch 42 will always remain substantially free from stress and impact loading and the internal stops in the track assemblies are not used and therefore not stressed.

What is claimed is:

1. A pivotable seat assembly for a mobile vehicle that allows the seat to be adjusted in fore or aft directions, pivoted to a position facing either of said directions, and then releasably latched against pivoting comprising:

a rigid, stationary, substantially vertical support shaft member securable to said vehicle and including a freestanding end having a primary abutment means thereon;

a rotatable support frame member having a top portion, said support frame member rotatably mounted on said support shaft member with said primary abutment means projecting beyond said top portion;

a carriage means that supports said seat on said rotatable support frame member for sliding movement to a limit position;

a latch assembly for selectively preventing rotation of said rotatable support frame member operatively connected between said support shaft and said rotatable support frame, including, a fixed latch secured to said one of said members; and a shiftable latch mounted on the other of said members for movement into and out of engagement with said fixed latch and having a biasing means for normally biasing said shiftable latch into said engagement;

a primary stop means mounted on said carriage means for movement therewith in said fore and aft directions and contactable with said primary abutment means to define said limit position; and a latch actuator mounted on said carriage for movement therewith into contact with said shiftable latch to move it out of engagement with said fixed latch and permit pivoting of said seat when said primary stop means is in contact with said primary abutment means to limit the amount of stress applied to said shiftable latch and slidable carriage.

2. The pivotable seat assembly according to claim 1 wherein said fixed latch is nonrotatably secured to said freestanding end of said support shaft; and said shiftable latch is mounted on said rotatable support frame member.

3. The pivotable seat assembly according to claim 1 wherein said support shaft is hollow to serve as a raceway for electrical conductors and has a conductor egress opening adjacent said freestanding end above said top portion.

4. The pivotable seat assembly according to claim 3 wherein a control switch means is mounted on said fixed latch adjacent said conductor egress opening.

5. The pivotable seat assembly according to claim 1 wherein said primary stop means includes a plate portion having an abutment stop and wherein said latch actuator is on said plate portion offset from said abutment stop.

6. The pivotable seat assembly according to claim 5 wherein said primary abutment means on the freestanding end of said stationary support shaft has fore and aft sides;

said abutment stop is aligned to contact one or the other of said sides depending upon which fore and aft direction the carriage is moved;

said shiftable latch is mounted in spaced adjacent relation to the other of said sides and has a latch contact portion; and said latch actuator includes a push member on said plate portion that is offset from said freestanding end for bypassing it and contacting said shiftable latch when said abutment stop is in contact with primary abutment means on said freestanding end.

7. The pivotable seat assembly according to claim 1 wherein said shiftable latch includes a plate means;

a pivot pin mounted in said plate means to project therefrom for pivotal mounting in said rotatable support member; and a latch pin mounted in said plate means in spaced relation to said pivot pin for engagement with said fixed latch.

8. The pivotable seat assembly according to claim 7 wherein said plate means includes upper and lower plate means spaced so that said fixed latch will pass therebetween; and said latch pin extends between said upper and lower plate means for engagement with said fixed latch.

* * * * *